United States Patent
Sugihara et al.

(10) Patent No.: US 11,548,107 B2
(45) Date of Patent: Jan. 10, 2023

(54) METHODS OF MODIFYING MATERIAL FLOW MODE DURING MACHINING AND PRODUCTS FORMED THEREBY

(71) Applicant: Purdue Research Foundation, West Lafayette, IN (US)

(72) Inventors: Tatsuya Sugihara, Osaka (JP); Srinivasan Chandrasekar, West Lafayette, IN (US); Anirudh Udupa, West Lafayette, IN (US); Koushik Viswanathan, Bangalore (IN); Kevin Paul Trumble, West Lafayette, IN (US); James Bradley Mann, Pensacola, FL (US)

(73) Assignee: Purdue Research Foundation, West Lafayette, IN (US)

( * ) Notice: Subject to any disclaimer, the term of this patent is extended or adjusted under 35 U.S.C. 154(b) by 187 days.

(21) Appl. No.: 17/091,400

(22) Filed: Nov. 6, 2020

(65) Prior Publication Data
US 2021/0205940 A1 Jul. 8, 2021

Related U.S. Application Data

(60) Provisional application No. 62/957,379, filed on Jan. 6, 2020.

(51) Int. Cl.
*C23C 8/02* (2006.01)
*B23P 25/00* (2006.01)
*B05D 1/18* (2006.01)
*C23C 8/40* (2006.01)

(52) U.S. Cl.
CPC ............ *B23P 25/003* (2013.01); *B05D 1/185* (2013.01); *B05D 2202/25* (2013.01); *C23C 8/02* (2013.01); *C23C 8/40* (2013.01)

(58) Field of Classification Search
None
See application file for complete search history.

(56) References Cited

U.S. PATENT DOCUMENTS

2017/0014862 A1* 1/2017 Yeung .................... B05D 3/002

OTHER PUBLICATIONS

Udupa et al., "Material-Independent Mechanochemical Effect in the Deformation of Highly-Strain-Hardening Metals", Physical Review Applied, 10, 014009 (Year: 2018).*

* cited by examiner

*Primary Examiner* — Shamim Ahmed
*Assistant Examiner* — Bradford M Gates
(74) *Attorney, Agent, or Firm* — Hartman Global IP Law; Gary M. Hartman; Domenica N. S. Hartman

(57) ABSTRACT

Methods of inducing segmented flow in a material in which a ductile flow mode would otherwise occur during machining. A monolayer molecular film is formed on a surface of a body of a material in a state such that the material exhibits ductile flow when subjected to shear. The monolayer molecular film has molecules each having a head group adsorbed to the surface, a terminal group, and a hydrocarbon chain therebetween having a chain length of greater than 6. A surface portion of the body is removed by engaging the body with a tool in a contact region below the surface of the body and moving the tool relative to the body to remove the surface portion and the monolayer molecular film thereon. The monolayer molecular film induces segmented flow in the material during the removing of the surface portion.

20 Claims, 8 Drawing Sheets
(7 of 8 Drawing Sheet(s) Filed in Color)

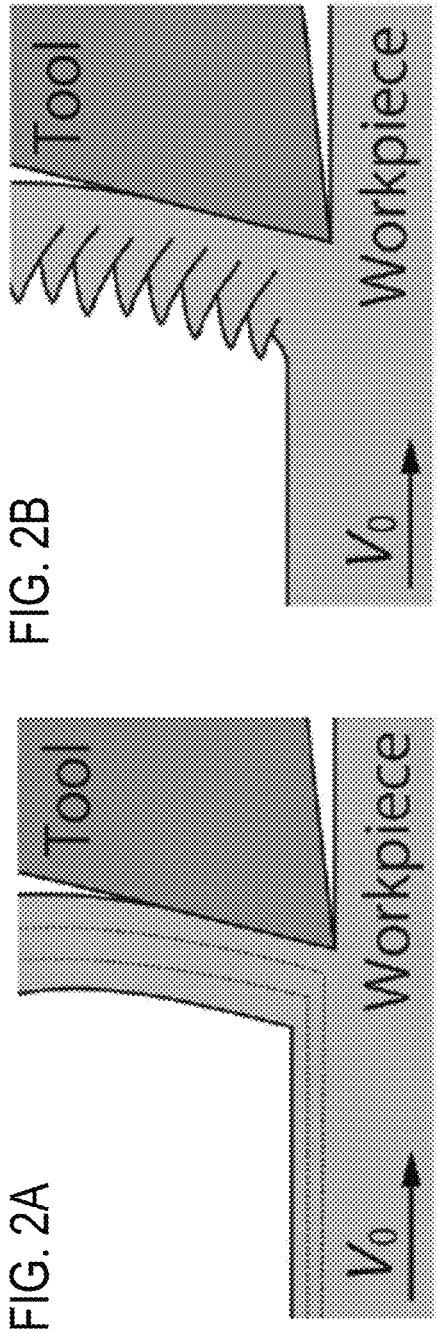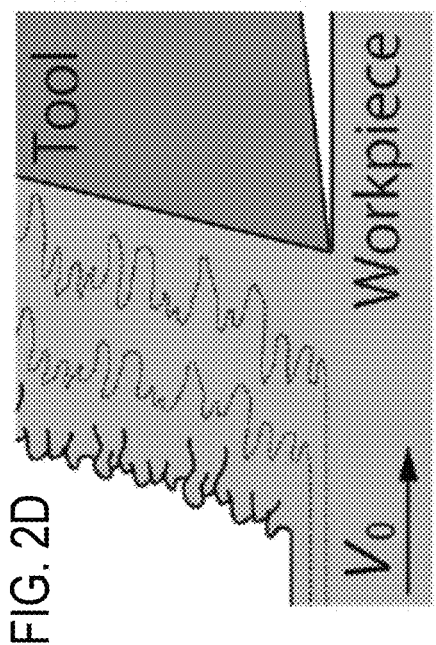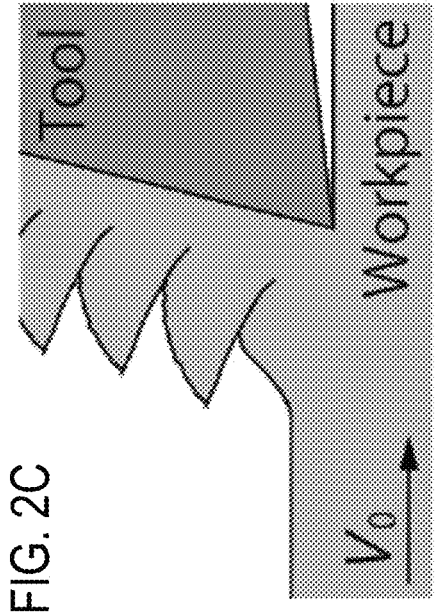

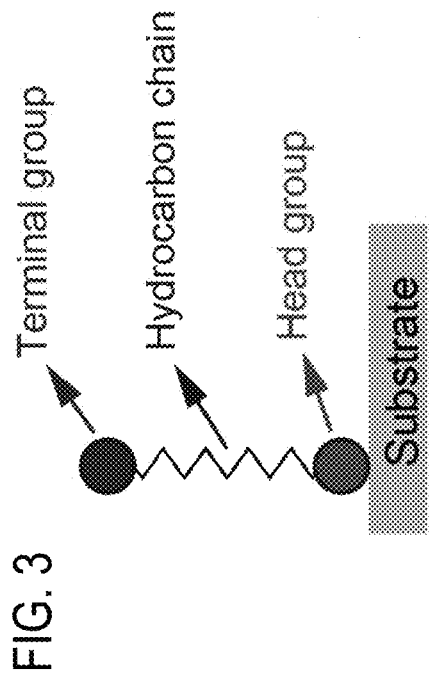
FIG. 3
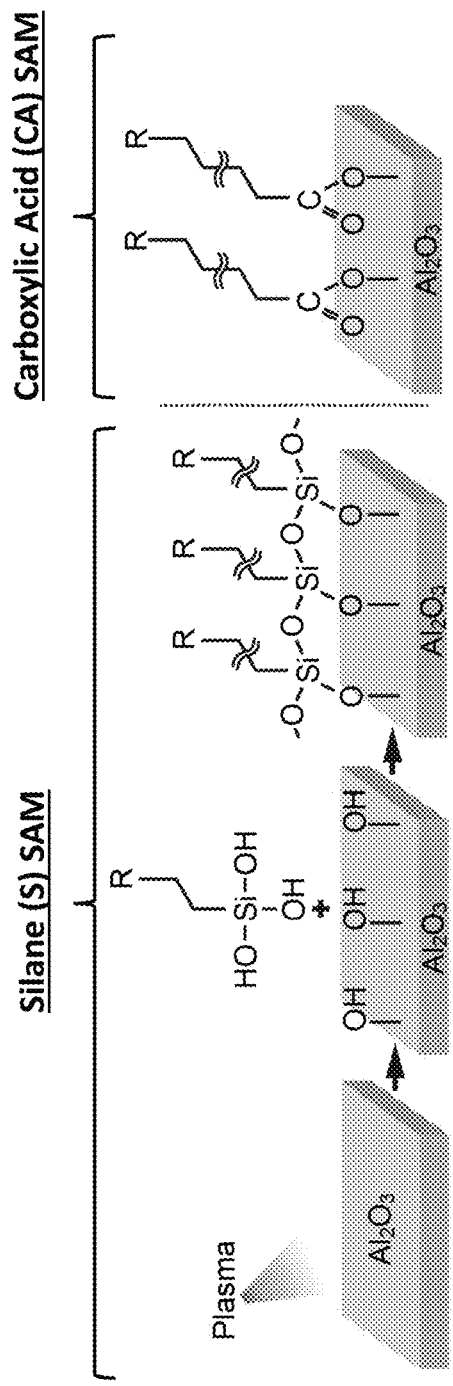
FIG. 4A
FIG. 4B

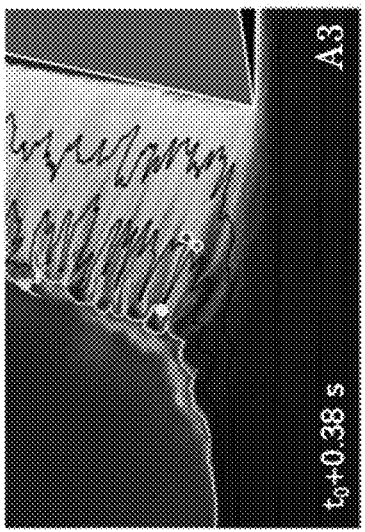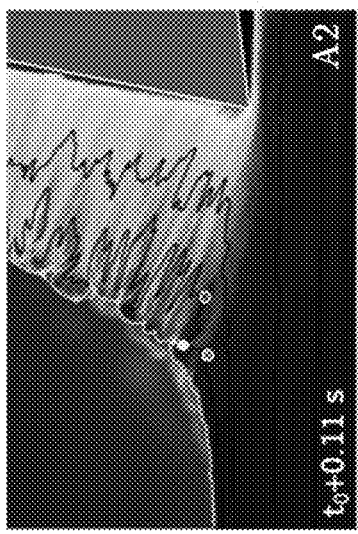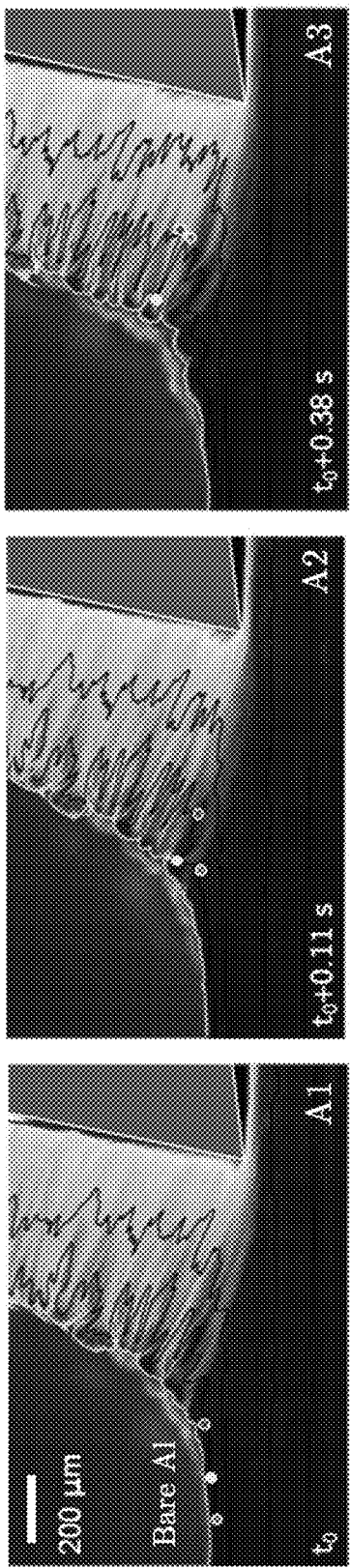
FIG. 10A  FIG. 10B  FIG. 10C
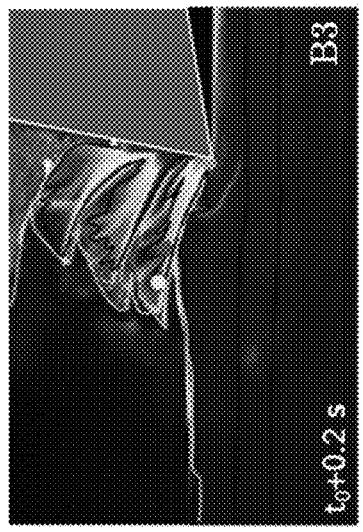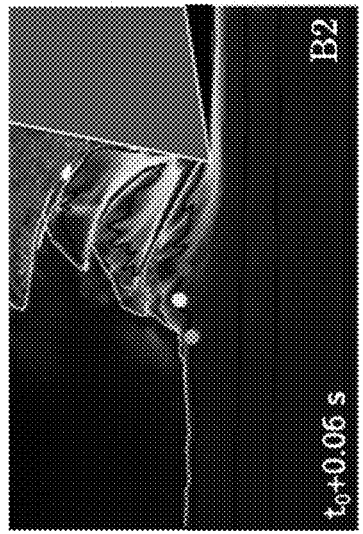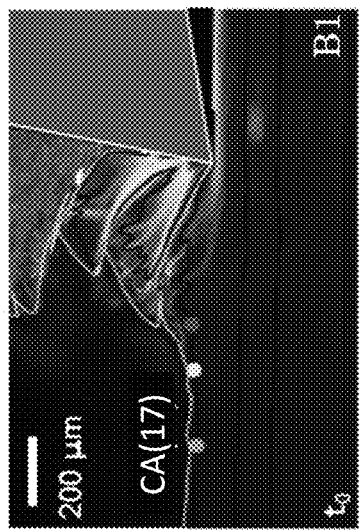
FIG. 10D  FIG. 10E  FIG. 10F

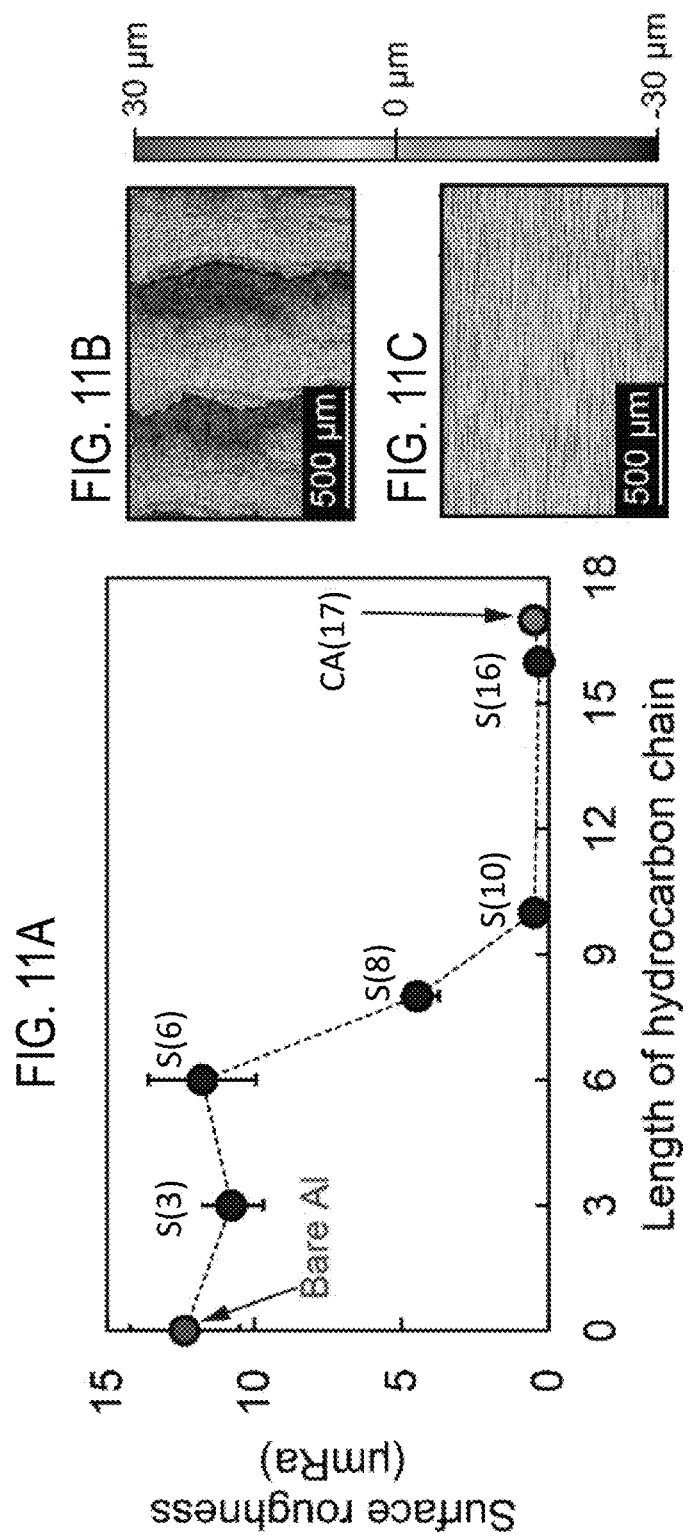

METHODS OF MODIFYING MATERIAL FLOW MODE DURING MACHINING AND PRODUCTS FORMED THEREBY

CROSS-REFERENCE TO RELATED APPLICATIONS

This application claims the benefit of U.S. Provisional Application No. 62/957,379 filed Jan. 6, 2020, the contents of which are incorporated herein by reference.

STATEMENT REGARDING FEDERALLY SPONSORED RESEARCH

This invention was made with government support under contract numbers CMMI 1562470 and DMR1610094 awarded by the National Science Foundation, and with support under award number DE-EE0007868 awarded by the U.S. Department of Enemy. The government has certain rights in the invention.

BACKGROUND OF THE INVENTION

The present invention generally relates to processes for machining materials. The invention particularly relates to methods for improving the machinability of relatively soft and/or ductile materials, such as but not limited to annealed metals and/or alloys.

A typical machining process involves removal of material with what is generically referred to herein as a wedge or tool. As represented in FIG. 1, simple-shear large-strain deformation is imposed on a workpiece ("body") by a rigid wedge ("tool") as the tool and body move at a velocity $V_0$ relative to each other. A thin layer of material of initial thickness $h_0$ is continuously deformed under simple shear and removed as a "chip" of thickness $h_c$. The original surface of the body at which cutting takes place is referred to as a "free surface," a "residual (cut) surface" is created by the tool on the body as a result of removing the chip, and an "under surface" is created by the tool on the chip opposite the free surface. The chip slides over a surface of the tool referred to as the rake face, and the angle between the rake face of the tool and the normal to the free-surface is referred to as the rake angle $\alpha$. Under appropriate conditions, the chip removed from the body may be in the form of a continuous chip. This configuration, analogous to cutting, is well characterized in terms of loading and chip deformation.

FIGS. 2A-D schematically represent four principal plastic-flow modes and their corresponding chip morphologies which have been identified for chip formation in simple-shear large-strain deformation of metals by cutting operations of the type represented in FIG. 1. These modes are generally referred to as laminar flow characterized by steady homogeneous deformation (FIG. 2A), shear-band flow characterized by periodic localized deformation restricted to very narrow zones (FIG. 2B), segmented flow characterized by nonuniform deformation and periodic fracture (FIG. 2C), and sinuous flow characterized by surface (plastic) buckling, material folding, and highly nonhomogeneous straining (FIG. 2D). The homogeneous and nonhomogeneous characteristics of the laminar and sinuous flow modes are schematically represented by the overlaid streakline patterns shown in FIGS. 2A and 2D. The plastic flow during chip formation produced by shear-band and segmented flow is locally brittle, whereas the plastic flow during chip formation produced by sinuous flow is locally ductile.

Certain soft and/or ductile metals and highly strain-hardening metals such as aluminum, copper, iron (including stainless steels), tantalum, titanium, and nickel and their respective alloys are often difficult to machine because of their propensity to undergo sinuous flow. As schematically represented in FIG. 2D, sinuous flow is characterized by large-amplitude folding and extensive redundant deformation (unnecessary deformation in so far as shape change is concerned) that results in relatively thick chips, high cutting forces, and poor surface finish of the residual (cut) surface. Consequently, these metals are often referred to as "gummy" in terms of their cutting behavior. In contrast, materials that undergo laminar, shear-band, or segmented flow modes (FIGS. 2A-C) are typically characterized by lower cutting forces, thinner chips, and better surface quality of the residual (cut) surface.

As disclosed in U.S. Pat. No. 10,413,934 and copending U.S. Patent Application Publication No. 2020/0023405 (each of whose contents are incorporated herein by reference), the application of certain adhesive media such as inks and glues (films of thicknesses of several micrometers, and therefore not a monolayer molecular film or an ultra-thin molecular film) to the free surface of soft and/or ductile metals can reduce or even suppress the sinuous flow mode during machining and replace this mode with the laminar flow mode (FIG. 2A) characterized by reduced cutting forces, thinner chips, and better machined surface quality. The phenomenon of flow mode modification via use of the adhesive media is termed a mechanochemical (MC) effect, and is not a lubrication effect. The mechanism underlying the effect is a local change in the material behavior from ductile to brittle with reduction in energy dissipation. Another example of how a thin film (not a monolayer molecular film or an ultra-thin molecular film) may show this effect is disclosed in Udupa et al., Altering the Stability of Surface Plastic Flow via Mechanochemical Effects, Phy. Rev. Applied 11, 014021 (2019), whose contents are incorporated herein by reference.

Despite the benefits of the above-noted processes, there is an ongoing desire for methods capable of modifying the flow modes when cutting metals, including but not limited to aluminum, copper, iron (including stainless steels), tantalum, titanium, and nickel and their respective alloys.

BRIEF DESCRIPTION OF THE INVENTION

The present invention provides methods capable of producing chips by segmented flow in materials in which a ductile flow mode (for example, sinuous) would otherwise occur when subjected to shear, such as what occurs during machining.

According to one aspect of the invention, a method includes providing a body of a material in a state such that the material exhibits ductile flow when subjected to shear. A monolayer molecular film is formed on a surface of the body to have molecules each having a head group adsorbed to the surface, a terminal group on an end of the molecule oppositely disposed from the head group, and a hydrocarbon chain therebetween that has a chain length of greater than 6. A surface portion of the body having the monolayer molecular film thereon is removed by engaging the body with a tool in a contact region below the surface of the body and moving the tool relative to the body to remove the surface portion of the body and a portion of the monolayer molecular film thereon, produce a residual cut surface of the body, and produce the chip having the portion of the monolayer molecular film thereon. The monolayer molecular film induces segmented flow in the material of the body during the removing of the surface portion.

Other aspects of the invention include products (for example, the machined body and/or the chip) produced/formed by a method such as that described above.

Technical effects of the method described above preferably include the capability of machining materials in a softened and/or ductile state to produce chips via segmented (brittle) flow rather than ductile flow inherent in certain materials in a softened and/or ductile state, preferably resulting in reduced cutting forces, improved and thinner chips, and improved surface finishes at the residual (cut) surface of the material. Such effects are obtained through the use of a monolayer molecular film whose molecules attach to a surface by adsorption, likely chemical adsorption and in some cases possibly physical adsorption, the former of which may involve a chemical reaction that mediates film formation.

Other aspects and advantages of this invention will be appreciated from the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A through 2D are schematic representations of four principal plastic-flow modes and corresponding chip morphologies in simple-shear deformation of metals by cutting: laminar flow (FIG. 2A), shear-band flow (FIG. 2B), segmented flow (FIG. 2C), and sinuous flow (FIG. 2D).

FIG. 3 is a schematic representation of a molecule adsorbed on a metal surface and head and terminal groups and a hydrocarbon chain of the molecule.

FIGS. 4A and 4B contain schematic overviews of two procedures used during investigations to deposit monolayer (molecular) films on surfaces, wherein the films are self-assembled monolayers (SAM).

FIGS. 10A through 10F are high-speed images of (contrasting) plastic flow modes in a bare aluminum workpiece (FIGS. 10A-10C) and an aluminum workpiece having a long-chain SAM film (FIGS. 10D-10F) to reveal the origins of an MC effect induced by a long-chain SAM film. Select images, with strain-field (background color) and streaklines superimposed, show the development of flow. Flow development is tracked via superimposed green, yellow and red points that are initially collinear in FIG. 10A (frame A1) and FIG. 10D (frame B1). In the bare aluminum workpiece (FIGS. 10A-10C), shearing results in sinuous flow with wavy streaklines, heterogeneous straining, and the formation of a relatively thick chip as seen in FIGS. 10A-10C. A bump forms on the workpiece surface ahead of the chip in FIG. 10B (frame A2). The bump grows in amplitude, rotates and shears to form a fold in FIG. 10C (frame A3). The final chip is a stack of folds, with fold interfaces resembling notches. In the aluminum workpiece having the long-chain SAM film (FIGS. 10D-10F), shearing results in an MC effect characterized by segmented flow seen in FIGS. 10D-10F. Movements of the green, yellow and red points in FIGS. 10D and 10E (respectively, frames B1 and B2) are similar to that seen in FIGS. 10A and 10B (frames A1 and A2), except between FIGS. 10E and 10F (respectively, frames B2 and B3) a crack initiates from the workpiece surface and propagates towards the wedge-tip of the cutting tool, causing a large separation between the yellow and green points. This cracking, which arrested the sinuous flow in its incipient stage, is recurrent and results in the segmented flow.

FIG. 11A contains a graph and FIGS. 11B and 11C contain images that characterize the surface quality of residual (cut) surfaces of aluminum bodies that either had or did not have a SAM on their free surface, and consequently exhibited or did not exhibit an MC effect. The graph of FIG. 11A plots variations of arithmetic average surface roughness (Ra) with the hydrocarbon chain length of the SAM, and evidences more than an order of magnitude improvement in the surface roughness (Ra) for chain lengths of 10 or greater (resulting from the MC effect), compared to SAMs with chain lengths of less than 8 and the bare aluminum body (in which no MC effect was observed). The improvement in surface quality was concomitant with a large force reduction due to the MC effect. FIG. 11B is an image of the cut surface of the bare aluminum body showing extremely poor surface quality with periodic cracks and tears. FIG. 11C is an image of the cut surface of a workpiece produced with the S(16) SAM film (silane head group and chain length of 16), wherein the cut surface exhibits excellent surface quality and is devoid of cracks and tears.

DETAILED DESCRIPTION OF THE INVENTION

Figure 1:
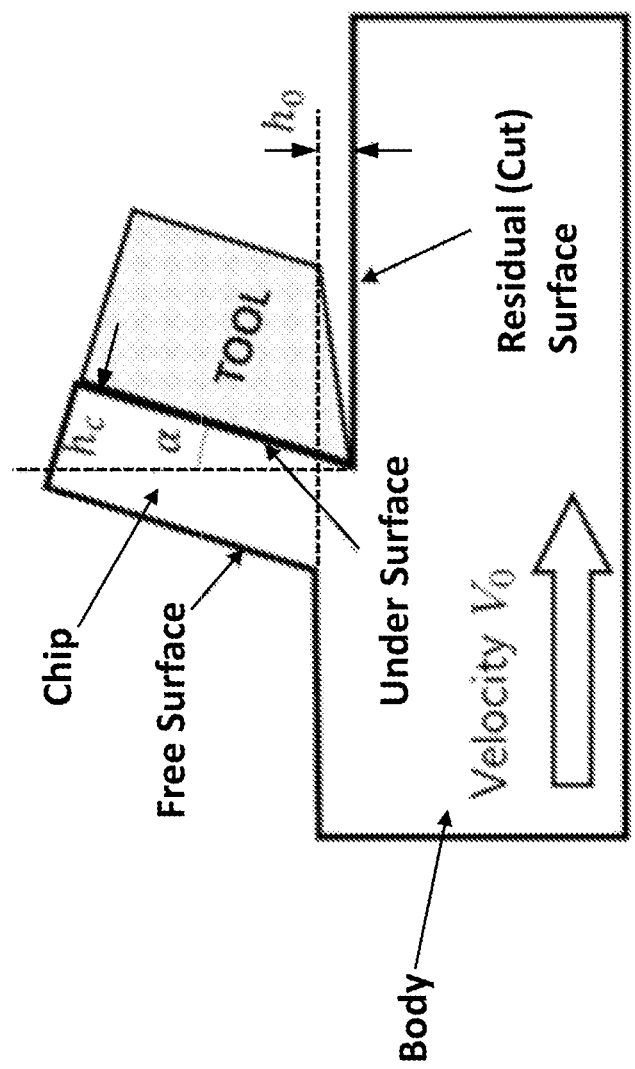
FIG. 1 is a schematic representation of plane-strain cutting of a body to impose simple-shear deformation in a chip.

Disclosed herein are methods and materials for modifying the mode of material flow during machining of bodies formed of certain materials, including soft and/or ductile metals and highly strain-hardening metals such as but not limited to aluminum, copper, iron (including stainless steels), tantalum, titanium, and nickel and their respective alloys. Specifically, materials which under a predetermined machining environment would normally experience ductile flow (including but not limited to sinuous flow) when subjected to shear (which typically includes tensile and/or compressive loading), such as what occurs during machining, are instead induced to experience segmented (brittle) flow due to the application of a monolayer molecular film that attaches by adsorption to a surface of a body (workpiece) formed of the material. Depending on the type of monolayer molecular film, adsorption may be chemical adsorption (chemisorption) involving a chemical reaction such as a covalent bond that mediates film formation, or possibly physical adsorption (physisorption) by a van der Waals interaction. The monolayer molecular films comprise molecules each having a head group adsorbed to the surface, a hydrocarbon chain extending from the head group, and a terminal (tail or end) group on the end of the molecule distal of the head group. According to certain aspects of the invention, it is believed that the hydrocarbon chains (between the head and tail groups) should have a chain length of greater than 6, and more preferably greater than 8, for example 10 or more, in order to induce a ductile-to-brittle transition that results in segmented (brittle) flow instead of sinuous (or other ductile) flow during chip formation and large-strain plastic deformation associated therewith.

Notably, the invention utilizes monolayer molecular films that adsorb to a surface and have film thicknesses of less than 100 nanometers and often less than 25 nanometer, instead of films such as inks and glues that adhere to surfaces and have film thicknesses of several micrometers or more. The monolayer molecular films used herein include organic self-assembled monolayers (SAMs) which incorporate certain molecules in their chemistry. As used herein, a SAM is a molecular assembly of organic molecules capable of forming on a surface by chemical adsorption and organizing into more or less a large-ordered domain. In general, these molecules possess a head group that has a strong affinity to the surface and anchors the molecule to it.

SAMs are created by applying adsorbate molecules to a surface. The head groups of the adsorbate molecules chemically adsorb onto the surface followed by a slow organization of their hydrocarbon chains and finally their terminal groups, which assemble far from the surface. Initially, at small molecular densities on the surface, the adsorbate molecules form either a disordered mass of molecules or form an ordered two-dimensional "lying down phase," and at higher molecular coverage, over a period of minutes to hours, begin to form three-dimensional crystalline or semicrystalline structures on the surface. Areas of close-packed molecules nucleate and grow until the surface of the surface is covered in a single monolayer.

SAMs are usually referred to by their head group in the literature. In investigations reported below, tests were conducted with two families of SAMs: alkanosilanes (sometimes referred to herein as silane-head or "S" SAMs) and carboxylic (alkanoic) acids (sometimes referred to herein as carboxylic acid-head or "CA" SAMs). Alkanosilanes have a silane ($-SiO_3$) head group while carboxylic acids have a carboxyl ($-COOH$) head group, such that the inclusion of the silane-head and carboxylic acid-head SAMs in the investigations was useful to study possible influences of the head group on the MC effect. The hydrocarbon chains were made up entirely of methylene ($-CH_2-$) groups. Initially, the terminal groups for all of the SAMs were methyl ($-CH_3$) groups. In the investigations, alkanosilane (S) SAMs having hydrocarbon chain lengths of 2 to 18 evaluated. All the alkanosilanes that had hydrocarbon chain lengths of 6 or less did not show any effect in relation to the desired ductile-to-brittle transition that would result in segmented (brittle) flow instead of a ductile flow, whereas those with chain lengths greater than 6, and in particular greater than 8, induced a ductile-to-brittle transition and resulted in segmented flow. Notably, investigations in which the silane head group was maintained and the terminal group was varied between hydroxyl ($-OH$) and methyl ($CF_3$) groups did not alter this relationship. Instead, the desired ductile-to-brittle transition and resulting segmented flow appeared to be solely dependent on hydrocarbon chain length, with chain lengths of greater than 6 being necessary to induce this effect. In the investigations, carboxylic (CA) SAMs having hydrocarbon chain lengths of greater than 12 were evaluated and also shown to induce a ductile-to-brittle transition and result in segmented flow. As discussed below, beneficial effects of a ductile-to-brittle transition and resultant segmented flow have included, but are not limited to, suppression of ductile flow (e.g., transition to brittle flow), reduced cutting forces, and significantly improved surface finish of the residual (cut) surface of the workpiece (in comparison to the same workpiece machined under identical conditions but without a SAM).

The investigations reported below evidenced a unique mechanochemical (MC) effect mediated by the organic SAM films that were evaluated. The MC effect was prominently manifested as a dramatic disruption of plastic flow at the surface of a body being machined (e.g., FIG. 1), despite little change in the metal's bulk properties. The result was observed on the mesoscale as a fundamental transition in the mode of plastic flow, from unsteady sinuous flow that is characteristic of ductile metals, to a quasi-periodic segmented mode that is typical of brittle materials. By independently varying the surface energy and molecule chain length of the SAM films, the investigations indicated that this apparent embrittlement is likely driven by adsorption-induced surface stress, as opposed to surface energy reduction.

Nonlimiting embodiments of the invention will now be described in reference to experimental investigations leading up to the invention.

Figure 7:
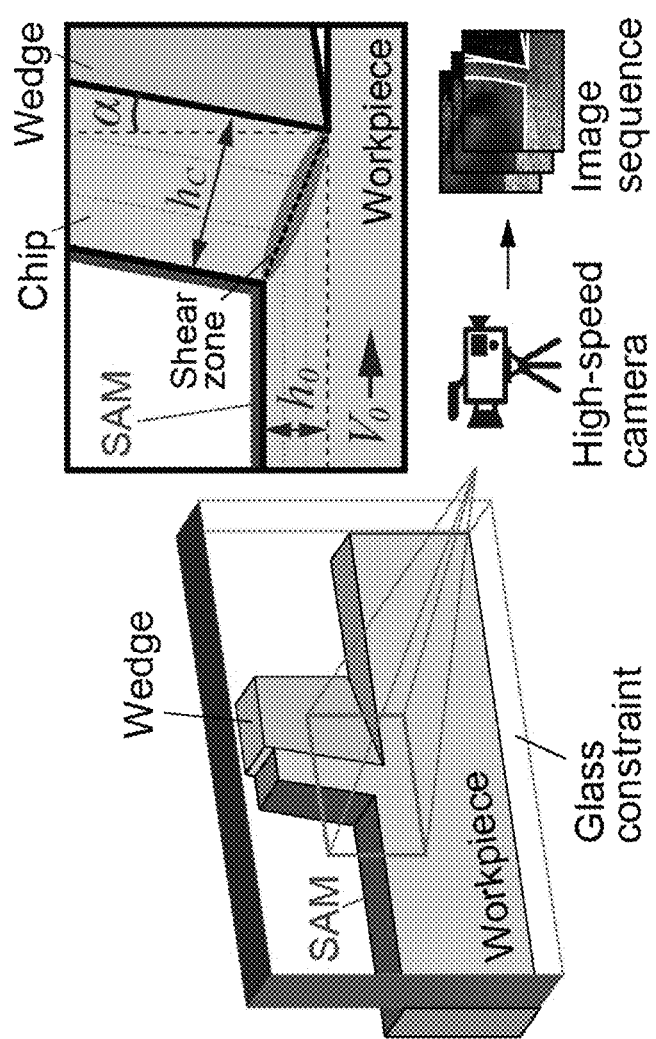
FIG. 7 is a schematic representation of an experimental setup used during investigations to machine a chip from a metal workpiece and capture high-speed images of the chip deformation zone for the purpose of characterizing flow patterns observed in situ and obtain quantitative flow-field information at high resolution.

For the investigations, aluminum was chosen as the workpiece material in part for its thin stable oxide ($Al_2O_3$) film which enables easy deposition of different SAM molecules, its significant ductility in the annealed state making film effects on plastic flow readily observable, and its deformation characteristics that are typical of technologically-relevant systems, such as stainless steels and Ni alloys. The workpieces were annealed commercially pure aluminum (Al 1100) in the form of a plate of dimensions 75 mm (length parallel to $V_0$)×25 mm×3 mm (width, into the plane), generally as represented in FIG. 7. The workpieces were annealed in a furnace at 550° C. for about four hours and furnace cooled to room temperature. The initial hardness of the workpieces was about 23 HV and the grain size was about 200 µm.

As previously noted, a SAM molecule has a head group that bonds strongly (chemisorbs) with the workpiece surface, a hydrocarbon chain and a terminal group, as schematically depicted in FIG. 3. The use of SAM molecules enabled the surface energy y and surface stress f to be independently altered. While the terminal and head groups determine the free surface and monolayer-metal interface energies respectively, surface stress can be varied by changing the hydrocarbon chain length, analogous to the Traube rule in liquids.

Prior to depositing the SAM films, the aluminum workpieces were ultrasonically cleaned in an ethanol bath for about five minutes and in pure water for about five minutes.

Slightly different procedures were followed to deposit the silane-head (S) SAMs and the carboxylic acid-head (CA) SAMs.

Formation of a silane-head (S) SAM is schematically represented in FIG. 4A. For this process, the aluminum workpiece surfaces were subjected to a plasma irradiation treatment (He gas, 100 Pa, 200 W, 120 seconds) to increase the density of the —OH groups on the surface. This promoted a strong bond between the aluminum (oxide) and the silane-based SAM molecules. Five different chemical agents were used to form the silane-head SAMs with different lengths of hydrocarbon chains: Trichloro(propyl)silane (S(3)), Trichloro(hexyl)silane (S(6)), Trichloro(octyl)silane (S(8)), Trichloro(decyl)silane (S(10)) and Trichloro(hexadecyl)silane (S(16)), all procured from Sigma Aldrich. Next, a 1 mM solution of a particular SAM molecule was prepared in ethanol. In addition to the SAM molecule, dibutyl in dilaurate was used as a catalyst and N-(1,3-Dimethylbutylidene)-3-triethoxysilyl-1-propanamine was used as a promoter, each mixed into the ethanol solution at a concentration of 1 mM each. The aluminum workpieces were then immersed in this solution for about one hour, followed by air-drying at room temperature (T=300 K) for about twelve hours. Finally, the workpieces were again cleaned ultrasonically in an ethanol bath for about five minutes, and in pure water for about five minutes, to complete the sample preparation.

Formation of a carboxylic acid-head (CA) SAM is schematically represented in FIG. 4B. For this process, a 1 mM solution of stearic acid (octadecanoic acid) in ethanol was prepared without use of any catalyst or promoter. The aluminum workpieces were then immersed in this solution for about one hour, followed by air-drying at room temperature (T=300 K) for about twelve hours. Finally, the workpieces were again cleaned ultrasonically in an ethanol bath for about five minutes and in pure water for about five minutes to complete the sample preparation.

Bare aluminum workpieces (i.e., free of any monolayer molecular film) and six aluminum workpieces having a SAM film were evaluated in the investigations. As a result of the procedure described above for the silane-head (S) SAM films, five of the six SAM molecules used had the same silane-based head and $CH_3$ terminal groups, but with hydrocarbon (methylene group) chain lengths between 3 and 16, denoted as S(3), S(6), S(8), S(10) and S(16), with "S" standing for silane and the number in the parentheses indicating chain length. A carboxylic acid-head (CA) SAM was the sixth SAM molecule used and had a $CH_3$ terminal group and a hydrocarbon (methylene group) chain length of 17, denoted CA(17) in which "CA" stands for carboxylic acid and the number in the parentheses indicates chain length.

Figure 6:
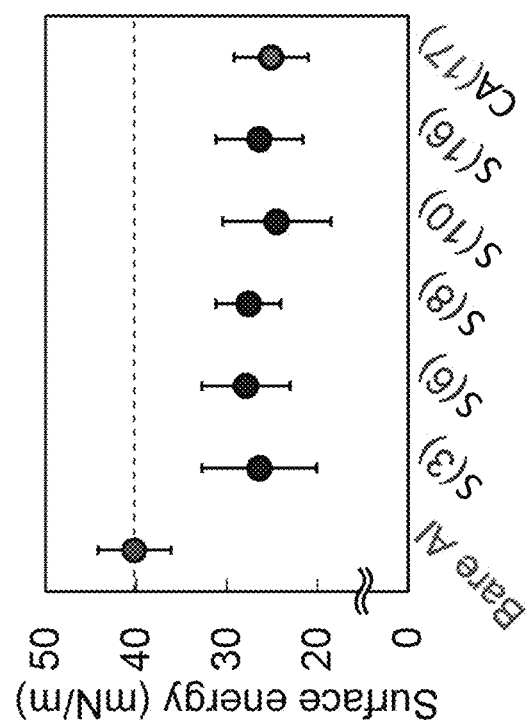
FIG. 6 is a graph plotting surface energies of a bare aluminum surface and aluminum surfaces on which different SAMs were deposited. The surface energies were obtained from contact-angles using Owens-Wendt theory. Surface energy is determined purely by terminal group and all of the SAMs show a uniform reduction of about 37% in surface energy compared to the bare aluminum surface.
Figure 5:
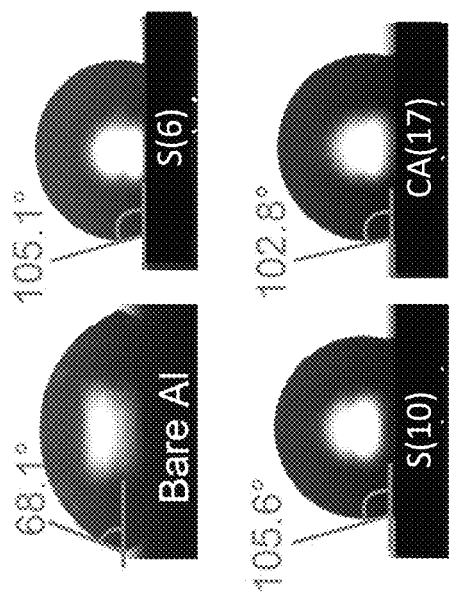
FIG. 5 is a schematic representation of contact angle measurements for a bare aluminum surface and aluminum surfaces on which different SAMs were deposited.

The surface energy change due to the SAM films was inferred using standard contact-angle measurements with deionized (DI) water and hexadecane. Since the contact angle is primarily determined by the terminal group of the molecules (—$CH_3$), there was no significant difference between the different SAM molecules (FIG. 5). However, there was a marked difference between a bare aluminum workpiece surface (Bare Al) and an aluminum workpiece surface on which a SAM film had been applied. The measured contact angles of the SAM-coated surfaces were consistent with those reported for a well-packed methyl surface, showing that each SAM film was uniformly deposited on the surface of its workpiece. Corresponding energy estimates shown in FIG. 6 evidence that the surface energies for the deposited SAM films were about 37% lower than the bare Al (surface energy 40 mN/m for $Al_2O_3$).

The effects of the SAM films on workpiece deformation behavior were studied using a 2-D (plane strain) shear configuration schematically represented in FIG. 7. A sharp wedge (cutting tool) was used to impose simple shear along a narrow zone, thereby 'peeling' off a narrow chip by plastic deformation. This shear loading is also representative of cutting and wear processes. The rectangular aluminum workpiece was moved at a constant velocity $V_0$ relative to the wedge, which was inclined at a rake angle α=10 degrees to the normal to the free-surface (inset of FIG. 7). Material of a depth $h_0$ (undeformed chip) was then continuously sheared into a chip of thickness $h_c$ (>$h_0$). The ratio $\lambda=h_c/h_0$, typically in the range of about 2 to 20 depending on the mesoscale plastic deformation mode operational, provided a measure of the imposed shear strain. In the investigations, the depth of material peeled (undeformed chip thickness, $h_0$) was set nominally at 50 μm, and the exact $h_0$ was obtained by direct measurement. A nominal velocity $V_0$=5 mm/s was used in all of the experiments, which was sufficiently low so that deformation was essentially quasi-static and temperature effects were negligible. The wedge was made of WC-Co cemented carbide (Tungaloy JVGR200FTH10) with an edge radius of less than 5 μm. The workpieces were constrained on one side by an optically transparent glass block (glass constraint) while being sheared. In addition to preventing out-of-plane (side) flow of the workpiece, the optically transparent glass block ensured plane-strain deformation and a clear plane of focus for imaging.

The investigations were performed at room temperature (T=300 K) without any lubricant. Near-surface material (plastic) flow was imaged using a high-speed CMOS camera (Photron WX-100) coupled to an optical microscope. A frame rate of 500 frames per second was used and the spatial resolution was 1.1 μm per pixel. The camera output was high-speed image sequences of the material flow, and the images were analyzed using digital image correlation (DIC) techniques to obtain material velocity, strain, and strain-rate fields in the deforming workpiece, enabling quantitative characterization of material deformation. The flow was visualized using streaklines, pixel-level strain and strain-rate fields. A streakline is defined herein as the locus of a fixed set of material points, as they are convected during material deformation. Concurrently, deformation forces, viz., the cutting (power) component (parallel to $V_0$) and the thrust component (perpendicular to $V_0$), were measured using a piezoelectric dynamometer (Kistler 9257B). The cutting force is the power component of the force and provides a direct measure of the energy dissipated in the shearing energy. The measured forces served to quantify a key attribute of the MC effect, besides providing an assessment of flow modes, flow transitions, and flow stability. Topographies of the cut surfaces in the wake of the wedge were characterized by optical profilometry to see how changes in flow dynamics influenced the peeling. At least five of each workpiece configuration (bare, silane-head SAM, and carboxylic acid-head SAM) were tested under each condition to ensure reproducibility.

Figure 8:
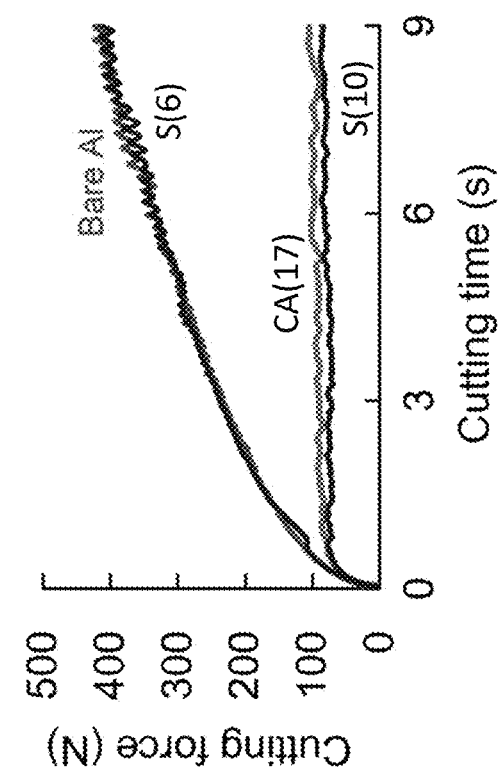
FIG. 8 is a graph comparing cutting forces on aluminum workpieces with and without a SAM film. A large force decrease (about 85%) typical of an MC effect is seen with long-chain SAMs (S(10) and CA(17)).

The long-chain SAM films (chain lengths of greater than 8) were found to have a major influence on workpiece deformation, thereby demonstrating an MC effect that was quantified by comparing force components for the various film-coated workpieces to the bare aluminum workpiece. In FIG. 8, the cutting force of the bare aluminum (Bare Al) workpiece (red curve) gradually increases to a steady-state value of about 600 N. The corresponding thrust force was about 550 N. These steady state values were exceptionally high, even higher than in similar simple shearing of hard steels. Additionally, after about 6 seconds of deformation, periodic oscillations can be seen in the force trace due to large cracks and tears that formed on the cut surface in the wake of the wedge (discussed below in reference to FIGS. 11A and 11B). The arithmetic average surface roughness (Ra) on the cut surface was 12.4 μm, characteristic of a very rough surface.

As evident from FIG. 8, there was no difference in the force trace between the S(6) and bare aluminum workpieces, indicating that the SAM molecules did not induce any MC effect. The force trace for the S(3) workpiece was essentially the same as the S(6) and bare aluminum workpieces. In complete contrast, the force was drastically reduced in the workpieces bearing a SAM film whose chain length was greater than 6. Exemplary are the S(10) and the CA(17) SAM films plotted in FIG. 8. For the cutting force, this reduction was about 85% (steady value 90 N) when compared to the steady-state bare aluminum workpiece. A similar reduction was seen with the thrust force (steady value 110 N). Furthermore, steady state was attained quickly (less than 1 second) (unlike in the bare aluminum workpiece which attained steady state after more than 10 seconds) and the force traces did not show any discernible oscillations. Consequently, the cut surface was practically devoid of any tears or cracks, with Ra=0.5 μm, an order of magnitude improvement compared to the bare aluminum workpiece. The force trace for the S(8) workpiece was intermediate between these two extremes, indicative of a partial effect.

Figure 9:
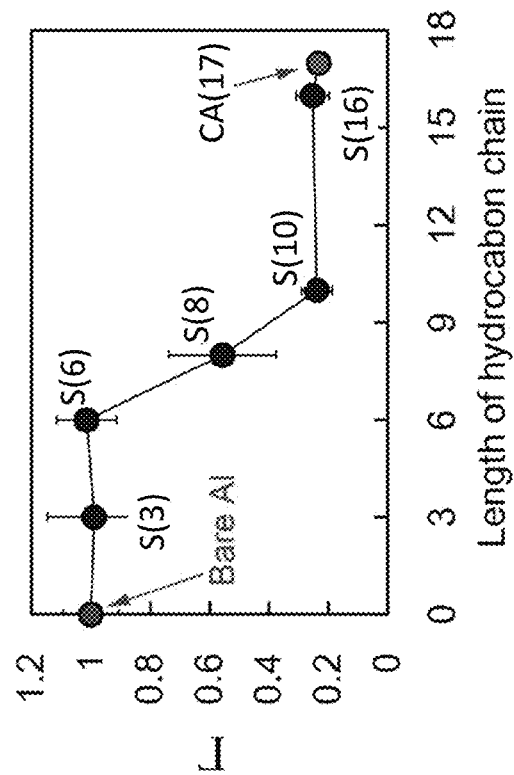
FIG. 9 is a graph plotting the ratio (F) of the maximum cutting force with a specific SAM film to the maximum cutting force without any SAM film (bare aluminum surface) as a function of chain length. A sharp decrease in F from 1 to about 0.15 occurred as chain lengths increased from 6 to 10, indicating that chain length had a large impact on inducing an MC effect.

The magnitude of the MC effect was captured by F, the ratio of the maximum cutting force with and without a SAM film. A ratio of 1 implies no effect, whereas a ratio of less than 1 implies an increasingly stronger effect as the ratio decreases. FIG. 9 shows the variation in $\Gamma$ with SAM molecule chain length. For bare aluminum and the S(3) and S(6) SAM films, $\Gamma=1$, but sharply transitioned to about 0.15 when for chain lengths exceeding 8. The S(8) molecule had a F of about 0.5 indicating that the MC effect was partial. FIG. 9 clearly evidences that the cutting force and the MC effect as a whole were strongly dependent on the monolayer chain length.

These force observations raised a question of how the SAM films induce an MC effect. To answer this, the development of near-surface plastic flow ahead of the wedge was analyzed using in situ high-speed imaging, examples of which are shown in FIGS. 10A through 10F. FIGS. 10A through 10C show a series of frames (A1-A3) from a high-speed sequence during cutting of a bare aluminum workpiece, with the strain-field and a few virtually computed streaklines overlaid. These frames were selected 1.9 s after the cutting began and the corresponding cutting force was about 220 N. At this stage, $h_c=650$μm, so that $\lambda=13$. As the cutting progressed, $h_c$ steadily increased to 1.3 mm, and $\lambda$ increased to 26.

From FIGS. 10A through 10C, it is apparent that deformation in a chip cut from a bare aluminum workpiece was very heterogeneous. Strains vary between 3.5 and 7 and the overlaid streaklines are wavy and sinuous, indicative of severely redundant plastic flow with vortex-like components. It is for this reason that this deformation mode is representative of what is referred to herein as sinuous flow. The sinuous features seen in FIGS. 10A through 10C explain the large energy dissipation/forces characteristic of this mode displayed in FIGS. 8 and 9. To understand the mechanics of this flow, the motion of three initially collinear material points (green, yellow and red, FIG. 10A) were tracked. As these points approach the wedge, a bump forms on the workpiece surface, causing the yellow point to move up relative to a line connecting the green and red points (FIG. 10B). The material then sheared and rotated, forming a large amplitude fold thereby reducing the distance between the red and green points relative to the yellow point (FIG. 10C). The bump and subsequent fold formation was continuously repeated. As a result, the folds stacked up on top of each other constituting the final chip, with the interfaces between the folds resembling notches. Sinuous flow was observed not only in the bare aluminum workpiece, but also in the aluminum workpieces carrying the S(3) and S(6) SAM films.

When the MC effect was present, i.e., reduction in cutting and thrust forces, the flow mode also fundamentally changed, as evident from FIGS. 10D through 10F depicting a similar sequence of images (frames B1 through B3) captured for the aluminum workpiece coated with the CA(17) SAM film. The average $h_c$ of about 425 μm and $\lambda=8.5$ were not only much reduced but also remained constant throughout the investigation. The chip can be seen in FIGS. 10D through 10F to consist essentially of periodic segments, each with small strain (about 2) zones separated by cracks appearing as narrow high-strain regions. This deformation mode, quite distinct from sinuous flow, is representative of what is referred to herein as segmented flow. Since the flow is dominated by periodic fracture, with relatively small-strain deformation in the segments themselves, it resulted in relatively low energy dissipation (forces) in the shearing investigations (FIGS. 8 and 9). In addition to the workpiece coated with the CA(17) SAM film, segmented flow was also observed with all of the other long-chain molecules, namely, S(10) and S(16), which also exhibited large force reductions (FIGS. 8 and 9).

The mechanics of segmented flow were analyzed in a manner analogous to sinuous flow by considering the displacement of three initially collinear material points (FIG. 10D). As the wedge advances, the yellow point moves up relative to the line connecting green and red points (FIG. 10D). However, at this junction a critical difference was observed. Rather than folds developing, the CA(17) film caused a crack to initiate from the workpiece free surface and propagate towards the wedge tip between yellow and green points. The speed of the crack front was 4 mm/s, comparable to $V_0$. The green point continued to move towards the wedge along with the crack front and the workpiece, whereas the yellow and red points remained stationary on opposite sides of the crack, resulting in large separation (FIG. 10F). These cracks initiated periodically from the free surface, thereby arresting the development of sinuous flow and resulting in segmented flow.

From the imaging investigations as well as ex situ observations of chip morphology, it was concluded that the role of the monolayer molecular film in the observed MC effect was to fundamentally alter the nature of near-surface plastic flow. More particularly, the long-chain monolayer molecular films "embrittled" the metal surface so that when the workpiece was loaded (here under simple shear), large strain plastic deformation became unstable resulting in crack propagation. Given that all the SAM molecules used had the same terminal group and reduced the surface energy by roughly the same amount (FIG. 6), it was concluded that surface energy was not the cause for the MC effect. Similarly, since the silane-based head group was held constant for five of the six SAM films, two of which did not show an effect (S(3) and S(6)) whereas the remaining three silane-based SAM films did show the MC effect (S(8), S(10) and S(16)), it was concluded that the head group also did not control the MC effect. Furthermore, the conventional explanation of diffusion or segregation induced cohesive energy change did not apply since the diffusivity of these molecules in metals is negligible. Rather, the critical characteristic of the monolayer molecular film molecules was the lengths of their hydrocarbon chains: molecules with long-chains (greater than 6 and more preferably greater than 8, for example, 10 or more) induced the MC effect, while shorter chains (6 or less) did not (FIGS. 8 and 9). It is expected that monolayer molecular films whose molecules have chain lengths of greater than those tested will also induce the MC effect observed during the investigations reported above.

The quality of the (residual) cut surfaces of the workpieces in the wake of the wedge and after approximately 6 seconds of the cut were measured using a laser scanning confocal microscope (Keyence VK-X250). FIG. 11A shows that the arithmetic average surface roughness (Ra) of the cut surface sharply decreased when the SAM chain length exceeded 6 and even more so when the SAM chain length exceeded 8. Thus the change in flow mode, from sinuous to segmented caused by the MC effect, also led to significant improvements in cut surface quality. In cutting of the bare aluminum workpiece and the SAM film-coated S(3) and S(6) workpieces, where sinuous flow was dominant and there was no MC effect, Ra was quite large, about 12.5 μm (FIG. 11A), and the surface was pockmarked by periodic cracks and tears due to material pull-out (FIG. 11B). The rough surfaces, with material pullout, were a consequence of the large forces associated with the sinuous flow; and the periodic pull-out was concluded to be the cause of the oscillations seen in the force trace (FIG. 8). This type of rough surface was seen to occur consistently with the sinuous flow. In contrast, the surfaces produced with the long-chain SAMs (S(10), S(16), and CA(17)), wherein segmented flow is observed, were always smooth (Ra=0.5 μm) as evident from FIGS. 11A and 11C, indicating that the MC effect should be beneficial also for enhancing quality of machined products.

The results described above strongly point to the central role of a tensile surface stress in causing the observed embrittlement, evidenced by the ductile-to-brittle transition from sinuous (ductile) flow to segmented (brittle) flow. Common mechanisms proposed for MC effects have usually involved two components: a mechanical contribution from external loading, and a chemical part which either lowers surface energy or otherwise has a corrosive effect at the notch-tip. In contrast, the shear deformation investigations reported herein with SAMs unequivocally showed that the chemistry of the molecule, controlled by the head and terminal groups, did not influence the workpiece ductility. Rather, the long-chain organic molecules induce a mechanical surface stress on the workpiece that inhibits dislocation emission, leading to apparent embrittlement of the metal surface. The result is a transition to segmented flow with lowered deformation forces, demonstrating the MC effect.

That the apparent film-induced embrittlement is driven by mechanical tensile surface-stress, as opposed to corrosive action, could also be the case in many stress corrosion phenomena, making this mechanism of quite general applicability. Additionally, one can envisage controlling MC effects using external fields, not unlike electrochemically induced deformation effects in nanoporous metals. Nonetheless, the SAM-metal combination studied in the investigations reported above was unique for multiple reasons. First, it showed that nanoscale changes in film chemistry can have a profound impact on macroscale mechanical behavior of relevance to wear and material removal processes. Second, and more practically, it allows for independent control of surface energy and surface stress via the head/terminal group and chain length, respectively. Such systems should be of value as general molecular probes for studying adsorption-induced deformation phenomena, in addition to the usual SAM-based surface engineering applications. Designer organic media could be formulated to enhance the capability of deformation, machining and comminution processes for metals.

In addition to the SAM compositions investigated, other SAM materials could be applied to various metals, alloys, and metallic materials, including the aforementioned aluminum, copper, iron (including stainless steels), tantalum, titanium, and nickel and their respective alloys which are soft and/or ductile metals or highly strain-hardening metals, as well as difficult-to-cut materials (as nonlimiting examples, Ti-based alloys and Ni-based alloys), and metals that form segmented chips under dry cutting conditions (as nonlimiting examples, Zn and brass). It is believed that SAMs capable of exhibiting characteristics and benefits identified during the above-reported investigations can be formed on any metal, alloy, or metallic material on whose surface an oxide layer is present. Additionally, it is foreseeable that the molecules (adsorbate) that form a monolayer molecular film can be introduced into a machining (or similar) process with a cutting fluid applied to the free surface to be machined, or applied to the free surface as a liquid in the form of a spray mist, or applied as a solid using an applicator rubbing against the free surface.

While the invention has been described in terms of specific or particular embodiments and investigations, it should be apparent that alternatives could be adopted by one skilled in the art. For example, the workpieces and cutting tools could differ in appearance and construction from the embodiments described herein and shown in the drawings, monolayer SAM or organo-metallic films other than those noted herein could be used, and process parameters such as cutting speeds could be modified. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A method comprising:
providing a body of a material in a state such that the material exhibits ductile flow when subjected to shear;
forming a monolayer molecular film on a surface of the body, the monolayer molecular film comprising molecules each having a head group adsorbed to the surface, a terminal group on an end of the molecule oppositely disposed from the head group, and a hydrocarbon chain therebetween, the hydrocarbon chain having a chain length of greater than 6; and
removing a surface portion of the body having the monolayer molecular film thereon by engaging the body with a tool in a contact region below the surface of the body and moving the tool relative to the body to remove the surface portion of the body and a portion of the monolayer molecular film thereon, produce a residual cut surface of the body, and produce a chip having the portion of the monolayer molecular film thereon;

wherein the monolayer molecular film induces segmented flow in the material of the body during the removing of the surface portion.

2. The method of claim 1, wherein the material of the body comprises a metal, alloy, or metallic material.

3. The method of claim 1, wherein the material of the body is chosen from the group consisting of aluminum and alloys thereof, copper and alloys thereof, iron and alloys thereof, tantalum and alloys thereof, titanium and alloys thereof, and nickel and alloys thereof.

4. The method of claim 1, wherein the surface of the body has an oxide layer thereon to which the molecules of the monolayer molecular film are adsorbed.

5. The method of claim 1, wherein the head groups of the molecules of the monolayer molecular film attach to the surface of the body via physical or chemical adsorption.

6. The method of claim 1, wherein the head groups of the molecules of the monolayer molecular film attach to the surface of the body via chemical adsorption.

7. The method of claim 1, wherein the chip is formed primarily by segmented flow.

8. The method of claim 1, wherein the chip is formed entirely by segmented flow.

9. The method of claim 1, wherein sinuous flow does not occur in the material of the body during the removing of the surface portion.

10. The method of claim 1, wherein the monolayer molecular film is a self-assembled monolayer (SAM) film.

11. The method of claim 10, wherein at least some of the head groups of the molecules are silane head groups.

12. The method of claim 10, wherein all of the head groups of the molecules are silane head groups.

13. The method of claim 10, wherein at least some of the head groups of the molecules are carboxylic acid head groups.

14. The method of claim 10, wherein all of the head groups of the molecules are carboxylic acid head groups.

15. The method of claim 1, wherein the chain lengths of the hydrocarbon chains of at least some of the molecules are greater than 8.

16. The method of claim 1, wherein the chain lengths of the hydrocarbon chains of at least some of the molecules are at least 10.

17. The method of claim 1, wherein the chain lengths of the hydrocarbon chains of at least some of the molecules are up to 17.

18. The method of claim 1, wherein the monolayer molecular film has a thickness of less than 100 nanometers.

19. The method of claim 1, wherein the monolayer molecular film has a thickness of less than 25 nanometers.

20. The method of claim 1, wherein the removing of the surface portion is a machining operation.

\* \* \* \* \*